United States Patent [19]

Wilking et al.

[11] Patent Number: 4,505,515
[45] Date of Patent: Mar. 19, 1985

[54] HINGE, PARTICULARLY FOR SEAT WITH ADJUSTABLE BACK REST

[75] Inventors: Hans Wilking, Rotselberg; Kurt Heinrich, Rockenhausen; Walter Peetz, Hackenheim, all of Fed. Rep. of Germany

[73] Assignee: Keiper Automobiltechnik GmbH & Co. KG, Remscheid-Hasten, Fed. Rep. of Germany

[21] Appl. No.: 402,818

[22] Filed: Jul. 28, 1982

[30] Foreign Application Priority Data

Jul. 31, 1981 [DE] Fed. Rep. of Germany ....... 3130313

[51] Int. Cl.³ ............................................. A47C 1/025
[52] U.S. Cl. ...................................... 297/362; 74/805
[58] Field of Search ............... 297/362, 355, 366, 367, 297/368, 369, 354; 74/804, 805, 449

[56] References Cited

U.S. PATENT DOCUMENTS

| 1,705,933 | 1/1928 | Lewis et al. | 74/449 |
| 4,200,333 | 4/1980 | Cremer et al. | 297/362 |
| 4,322,112 | 3/1982 | Berghaus et al. | 297/362 |

FOREIGN PATENT DOCUMENTS 579067  7/1924  France .................. 74/805

Primary Examiner—William E. Lyddane
Assistant Examiner—Mark W. Binder
Attorney, Agent, or Firm—Michael J. Striker

[57] ABSTRACT

A hinge, particularly for a seat with an adjustable back rest, has two hinge parts and an adjusting and fixing transmission including an internal gear and a spur gear therebetween and an axle provided with an eccentric, wherein the spur gear and the internal gear are formed as cup-shaped members connected for joint rotation with the hinge part, and the cup-shaped member forming the spur gear has teeth on its outer surface, whereas the cup-shaped member forming the internal gear has teeth on its inner surface.

10 Claims, 6 Drawing Figures

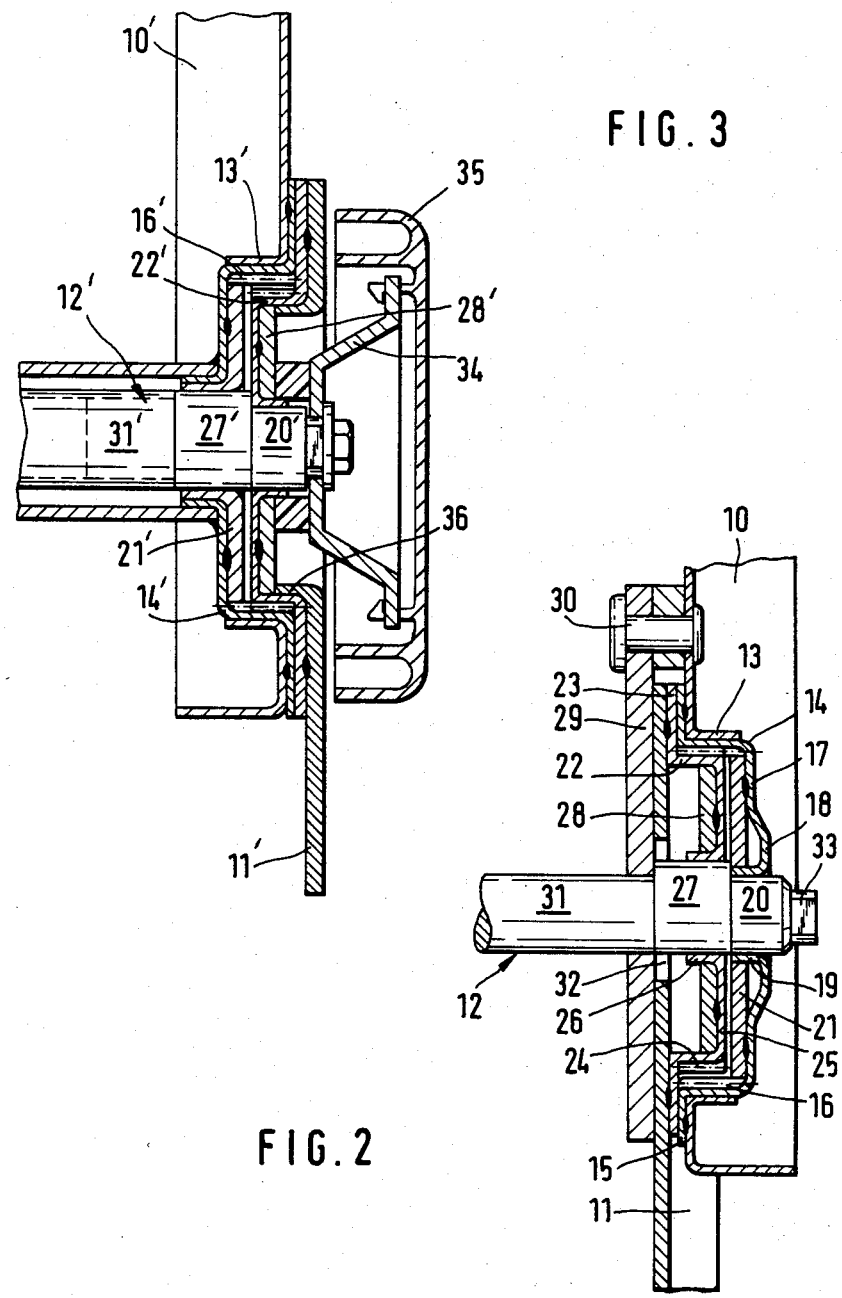

FIG. 4
FIG. 5
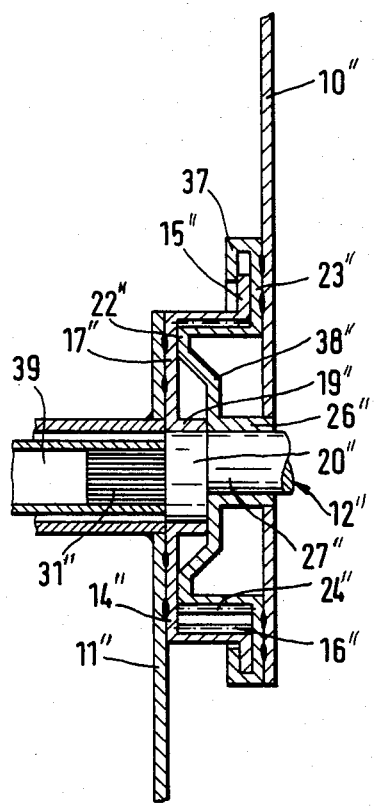
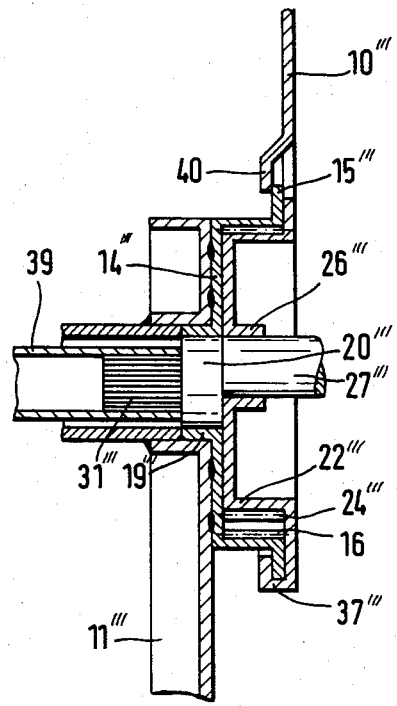

HINGE, PARTICULARLY FOR SEAT WITH ADJUSTABLE BACK REST

BACKGROUND OF THE INVENTION

The present invention relates to a hinge, particularly for a seat with an adjustable back rest.

Hinges of the above mentioned general type are known in the art. A known hinge has two movable hinge parts which are connected with one another by an axle and one of the hinge parts is integrated in a side member of a back rest frame or a seat part frame, wherein an adjusting and fixing arrangement is provided formed as a transmission with at least one internal gear and at least one support gear engaging with one another, and an eccentric arranged on the axle. One such hinge is disclosed, for example, in the DE-GM No. 7,830,544. In the hinge of this reference, the hinge parts associated with the back rest are connected with one another via a frame bracket which is supported either directly on a portion of the axle or fixedly connected with a bearing plate supported in turn on a portion of the axle. The hinge connectable with the frame bracket of the back rest and with the seat part has hinge parts whose thickness depends upon the tooth width of the outer teeth of the spur gear and the inner teeth of the internal gear which is selected in accordance with strength requirements. Both the outer teeth of the spur gear and the inner teeth of the internal gear are formed by stamping out of the hinge part. Thereby the material thickness of the hinge part is increased by the thickness of the connecting webs between the stamped out central disk and the rim surrounding the same. Such a hinge, whose structural parts have a thickness depending upon the tooth width required for strength, and also the connecting cross section designed for transmission of torque, is very material-consuming and has an increased seat weight.

SUMMARY OF THE INVENTION

Accordingly, it is an object of the present invention to provide a hinge, particularly for a seat having a back rest, which avoids the disadvantages of the prior art.

More particularly, it is an object of the present invention to provide a hinge, particularly for a seat having a back rest, in which the requirements as to its strength are completely satisfied, on the one hand, and whose material consumption is reduced as compared with known hinges without imposing special requirements as to its manufacture, on the other hand.

In keeping with these objects, and with others which will become apparent hereinafter, one feature of the present invention resides, briefly stated, in a hinge, particularly for a seat having a back rest, in which a spur gear and an internal gear of an adjusting and fixing transmission are formed as cup-shaped members connected with hinge parts for joint rotation therewith, wherein the cup-shaped members forming the spur gear is provided with teeth at its outer surface and the cup-shaped members forming the internal gear is provided with teeth at its inner surface.

The cup-shaped members, which can be produced by a pressing process, can be manufactured with a relatively small thickness, and the teeth provided on the peripheral surfaces of the cup-shaped members can be pressed in the same working step. These cup-shaped members, which are manufactured from a relatively thin-walled metal sheet material, considerably reduce the weight of the transmission parts of the hinge, as compared with known hinges.

For preventing deflection or bending of the cup-shaped disk, another advantageous feature of the present invention is that the cup-shaped members forming both the spur gear and the internal gear are surrounded at their periphery by collars of the hinge parts, and the bottoms of the cup-shaped disks are reinforced by insertable reinforcing members.

Since it is conventional for hinges with two opposite parts assembled to a frame bracket to manufacture the hinge parts from a thin-walled pressed metal sheet blank, a further feature of the present invention takes into consideration this manufacturing technique, in that at least one of the cup-shaped members are formed of one piece on one of the hinge parts.

For reducing the surface pressure in the region of the bearing locations without providing bearing bushes, still a further feature of the present invention resides in that the cup-shaped members are provided with flange sleeves arranged centrally to their teeth and supported on the associated portions of the axle. The bottoms of the cup-shaped members can be provided for increasing their stability and also for extending their supporting surfaces for the flange sleeves, with convex portions.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a view showing the hinge in accordance with the present invention in a section taken along the line 2—2 in FIG. 1;

FIG. 3 is a view substantially corresponding to the view of FIG. 2, but showing another embodiment of the present invention;

FIG. 4 is a view substantially corresponding to the views of FIGS. 2 and 3, but showing still another embodiment of the present invention;

FIG. 5 is a view substantially corresponding to the preceding views of FIGS. 2-4, but showing a further embodiment of the present invention.

DESCRIPTION OF THE PREFERRED EMBODIMENTS

Figure 1:
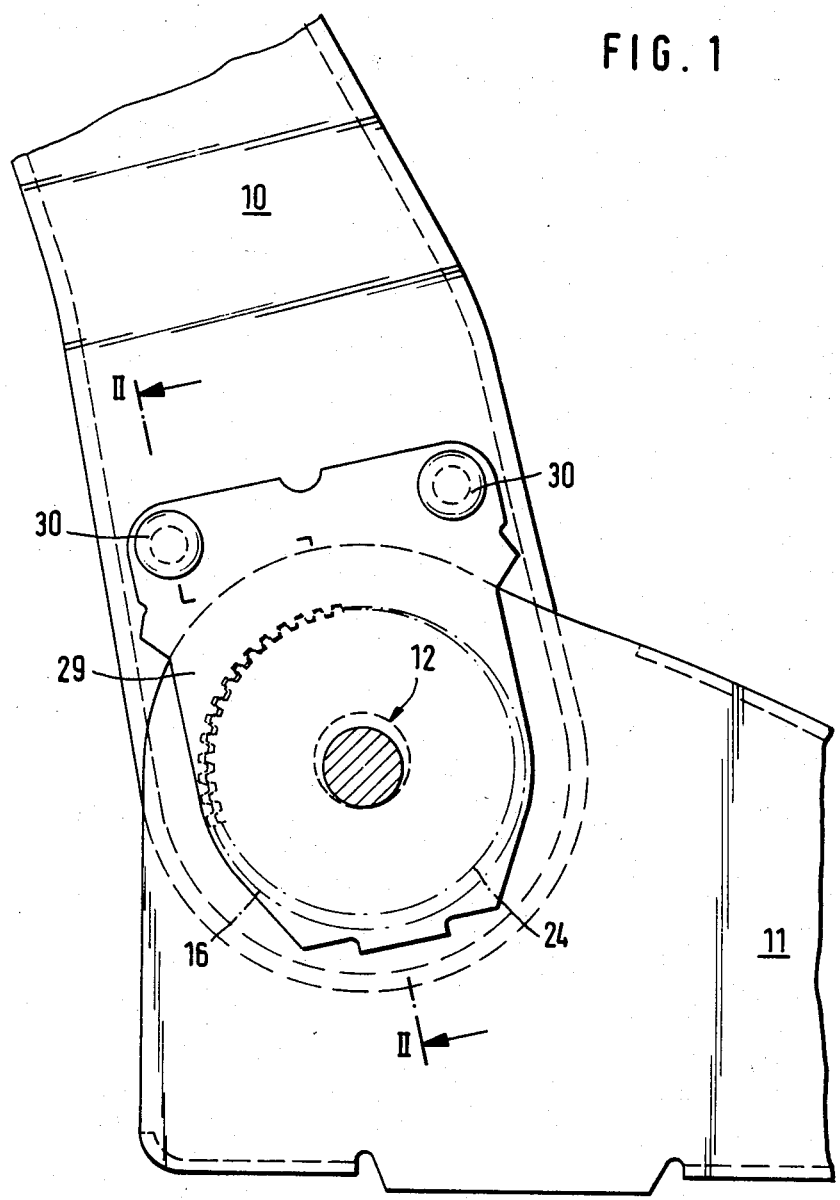
FIG. 1 is a side view of a hinge having two hinge members, particularly for a seat having a seat part and a back rest.
Figure 6:
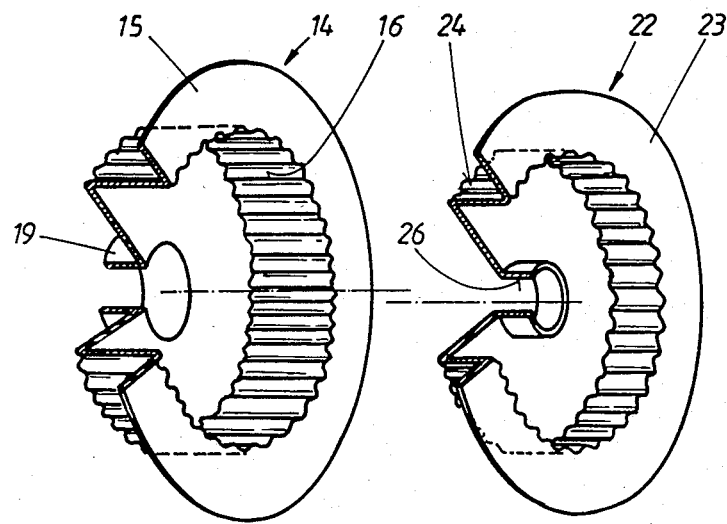
FIG. 6 is a perspective view showing toothed cup-shaped members of the inventive hinge.

A hinge, particularly for a seat, in accordance with the present invention, has a hinge part 10 which can form an arm end of a back rest frame. The hinge part 10 is pivotally connected with a hinge part 11 associated with a seat part, via an axle 12.

The hinge part 10 has in its hinge eye region an expanding collar 13. The collar 13 surrounds and engages an outer surface of a cup-shaped member 14. The cup-shaped member 14 has a radial collar 15 which is connected with the hinge part 10, for example by spot welding. Inner gears 16 are pressed in an inner surface of the cup-shaped member 14. They extend from the collar 15 to a bottom 17 of the cup-shaped member 14. The bottom 17 of the cup-shaped member has a convex portion 18 connected with a sleeve 19 concentric with the inner teeth 16.

The sleeve 19 is supported with its inner surface on a central portion 20 of the axle 12. The bottom 17 of the cup-shaped disk 14 is reinforced by a reinforcing disk 21. The reinforcing disk 21 is supported with its outer surface on the teeth heads of the inner teeth 16, on the one hand, and on the sleeve 19, on the other hand. The reinforcing disk 21 is connected with the bottom 17 of the cup-shaped member 14, for example by spot welding.

A further cup-shaped member 22 is connected with the hinge part 11, and more particularly a collar 23 of the cup-shaped disk 22 is connected with the hinge part 11, for example by spot welding. Outer teeth 24 are pressed on the outer surface of the cup-shaped member 22. The number of outer teeth 24 is smaller by at least one tooth than the number of inner teeth 16, and the head circle diameter of the outer teeth 24 is smaller by at least one tooth height than the foot circle diameter of the inner teeth 16 of the cup-shaped member 14. A bottom 25 of the cup-shaped member 22 which forms a spur gear is deformed in its central region so as to form a sleeve 26. The sleeve 26 is supported on an eccentric portion 27 of the axle 12. A reinforcing disk 28 is connected with the bottom 25 of the cup-shaped member 22, for example by spot welding. The reinforcing disk 28 abuts against a wall having the outer teeth 24, on the one hand, and against the sleeve 26 of the cup-shaped member 22, on the other hand.

A bearing plate 29 is connected with the hinge part 10, for example by a rivet 30 and supports with its central portion 31 on the axle 12. The eccentricity of the eccentric portion 27 relative to the portions 20 and 31 of the axle corresponds to the difference between the contact circle diameter of the inner teeth 16 and the outer teeth 24 of the internal gear 14 and the spur gear 22. The hinge part 11 has an opening 32 which surrounds the axle 12 and is such that the axle 12 can unobjectionably rotate therein, on the one hand, and the eccentric movement of the hinge part 10 is not hindered, on the other hand.

For adjusting the axle 12, the axle has a driver portion 33 which extends from the portion 20 and is provided with flattened sides. A driving disk 34 of an adjusting bottom 35 can be connected with the driver portion 33. When the axle of the shown in FIG. 2 is turned, the eccentric portion 27 supported in the sleeve 26 of the cup-shaped member 22 rotates so that the portions 20 and 31 of the axle move eccentrically about the eccentric portion 27. Thereby, via the cup-shaped member 14, the engaging point of its inner teeth 16 on the outer teeth 24 is so turned that with rotation of the axle 12 the engaging point between the teeth 16 and 24 is turned and, because of the different teeth numbers between the teeth 16 and 24, the hinge part 10 connected with the cup-shaped member 14 is further turned relative to the hinge part 11 by a tooth pitch corresponding to the different teeth numbers.

The hinge shown in FIG. 3 substantially corresponds to the hinge shown in FIG. 2. In contrast to the embodiment of FIG. 2, in the hinge of FIG. 3 a cup-shaped member 14' having inner teeth 16' and forming an internal gear is supported on an eccentric portion 27' of the axle 12'. A cup-shaped member 22, which forms a spur gear and is connected with a hinge part 11', is supported on a concentric portion 20' of an axle 12'. Because of the eccentric movement of the eccentric portion 27' about the concentric portions 20' and 31' during rotation of the axle 12', the cup-shaped member 14' having the inner teeth 16' moves about the cup-shaped member 22' forming the internal gear, so that a hinge part 10' of the embodiment of FIG. 3 obtains the same adjusting movement as the hinge part 10' of FIG. 2.

A further different between the hinge shown in FIG. 3 and the hinge shown in FIG. 2 is that, in the hinge in accordance with the embodiment of FIG. 2, not only the hinge part 10' surrounds with its collar 13' the outer surface of the cup-shaped member 14' with the teeth 16', but also the hinge part 11' is provided with a collar 36 which surrounds the cup-shaped member 22 at its inner surface.

The hinge shown in FIG. 4 differs from the hinges of FIGS. 2 and 3 in that a cup-shaped member 14" forming the internal gear is fixedly connected with a hinge part 11" which is associated with the seat part and is stationary. Correspondingly, a cup-shaped member 22" forming the spur gear is fixedly connected with a hinge part 10" associated with the back rest. A sleeve 19" of the cup-shaped member 14" is pivotally supported on a concentric portion 20" of an axle 12", whereas a sleeve 26" of the cup-shaped member 22" forming the spur gear is pivotally supported on an eccentric portion 27" of the axle 12. A collar 23" of the cup-shaped member 22", which is welded with the hinge part 10, is formed at its outer side with a claw ring 37. A collar 15" of the cup-shaped member 14" is guided in the claw ring 37" so that an eccentric rotary movement between the hinge parts 10" and 11" is possible with securing the axial hold of the hinge parts.

In contrast to the embodiments of FIGS. 2 and 3, the cup-shaped disk 14 of FIG. 4 is welded with its bottom 17" with the hinge part 11". Moreover, in contrast to the embodiments of FIG. 2, in the hinge of FIG. 4, the bottom of the cup-shaped disk 22" has a convex portion 38 which allows a longitudinal arrangement of sleeves 19" and 26" of the cup-shaped members 14" and 22". Furthermore, a concentric portion 31" is arranged for rotation of a transmission pipe 39 for transmitting the rotary movement obtained by the axle 12" to the hinge at the opposite longitudinal side of the seat. When the axle 12 is driven in rotation, the concentric portion 20" rotates in the sleeve 19" of the cup-shaped member 14" forming the internal gear and connected with the fixed hinge part 11. Since the eccentric portion 27" supporting the cup-shaped member 22" moves about the concentric portion 20 along an eccentric path, the engaging point between the teeth 16 and 24 rotates during rotation of the axle in the internal gear. Thereby a relative movement takes place between the hinge part 10" relative to the hinge part 11", which is so great during rotation of the axle 12 that the adjustment angle corresponds to the teeth pitch angle resulting from the teeth number difference.

The hinge shown in FIG. 5 substantially corresponds to the hinge of FIG. 4. In contrast to the embodiment of FIG. 4, in the hinge of FIG. 5, a cup-shaped member 22''', which forms the internal gear, is pressed of one piece from a hinge part 10'''. A claw ring 37''' acting for the axial hold is provided only in the lower region of the hinge part 10''' having a semicircular contour. A finger-shaped guiding tongue 40 is pressed out from the upper hinge eye region of the hinge part 10''', and a collar 15''' of the cup-shaped member 14''' forming the internal gear engages in the tongue 40, similarly to the lower claw ring half. The movement condition of the hinge shown in FIG. 5 corresponds to that of the hinge shown in FIG. 4.

It will be understood that each of the elements described above, or two or more together, may also find a useful application in other types of constructions differing from the types described above.

While the invention has been illustrated and described as embodied in a hinge, particularly for a seat having a back rest, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A hinge, particularly, for a seat having a seat part and an adjustable back part, comprising
   two hinge members pivotally connected with one another;
   an axle pivotally connecting said hinge members with one another; and
   adjusting and fixing means determining a relative position of said hinge members and formed as a transmission including an internal gear and a spur gear engaging with one another and an eccentric provided on said axle, said internal gear and said spur gear being formed as toothed cup-shaped members connected with said hinge members for joint rotation therewith, and the cup-shaped member which forms said spur gear having an outer surface provided with outer teeth, whereas the cup-shaped member which forms said internal gear has an inner surface provided with inner teeth meshing with said outer teeth of said cup-shaped member which forms said spur gear, so as to transmit torque, and said cup-shaped members being formed as thin-walled metal sheet pressed cup-shaped members with said surfaces having a predetermined axial length and said teeth extending substantially over the entire axial length of said surfaces.

2. A hinge as defined in claim 1, wherein each of the seat part and the back part has a frame, at least one of said hinge parts being integrated in the frame of one of the seat and back parts.

3. A hinge as defined in claim 1, wherein the cup-shaped disc which forms said internal gear has an outer periphery and the cup-shaped member which forms said spur gear has an inner periphery, at least one of said hinge members having a collar which surrounds and engages the periphery of at least one of said cup-shaped members.

4. A hinge as defined in claim 3, wherein the other of said hinge members also has a collar which surrounds and engages the periphery of the other of said cup-shaped disc.

5. A hinge as defined in claim 1, wherein each of said cup-shaped discs has a bottom portion; and further comprising at least one reinforcing disc which reinforces the bottom portion of at least one of said cup-shaped discs.

6. A hinge as defined in claim 5, and further comprising a second reinforcing disc which reinforces the bottom portion of the other of said cup-shaped discs.

7. A hinge as defined in claim 1, wherein at least one of said cup-shaped discs is formed of one piece with one of said hinge members.

8. A hinge as defined in claim 1, wherein at least one of said cup-shaped discs has a collar arranged concentrically with its teeth and supported on a portion of said axle.

9. A hinge as defined in claim 8, wherein the other of said cup-shaped discs also has a collar arranged concentrically to its teeth and supported on a portion of said axle.

10. A hinge, particularly, for a seat having a seat part and an adjustable back part, comprising
    two hinge members pivotally connected with one another;
    an axle pivotally connecting said hinge members with one another; and
    adjusting and fixing means determining a relative position of said hinge members and formed as a transmission including an internal gear and a spur gear engaging with one another and an eccentric provided on said axle, said internal gear and said spur gear being formed as toothed cup-shaped members connected with said hinge members for joint rotation therewith, and the cup-shaped member which forms said spur gear having an outer surface provided with outer teeth, whereas the cup-shaped member which forms said internal gear has an inner surface provided with inner teeth, each of said cup-shaped members also has a bottom portion, the bottom portion of at least one of said cup-shaped members having a convex section arranged so as to make longer a supporting surface for said collar.

* * * * *